United States Patent
Gao et al.

(10) Patent No.: US 11,885,947 B2
(45) Date of Patent: Jan. 30, 2024

(54) LATTICE LIGHT SHEET MICROSCOPE AND METHOD FOR TILING LATTICE LIGHT SHEET IN LATTICE LIGHT SHEET MICROSCOPE

(71) Applicant: WESTLAKE UNIVERSITY, Zhejiang (CN)

(72) Inventors: Liang Gao, Zhejiang (CN); Bi-Chang Chen, Taiwan (CN)

(73) Assignee: Westlake University, Zhejiang (CN)

( * ) Notice: Subject to any disclaimer, the term of this patent is extended or adjusted under 35 U.S.C. 154(b) by 423 days.

(21) Appl. No.: 17/289,554

(22) PCT Filed: Jul. 23, 2019

(86) PCT No.: PCT/CN2019/097237
§ 371 (c)(1),
(2) Date: Apr. 28, 2021

(87) PCT Pub. No.: WO2020/087998
PCT Pub. Date: May 7, 2020

(65) Prior Publication Data
US 2022/0019066 A1 Jan. 20, 2022

Related U.S. Application Data (60) Provisional application No. 62/751,635, filed on Oct. 28, 2018.

(51) Int. Cl.
*G01N 21/64* (2006.01)
*G02B 21/00* (2006.01)
*G02B 21/14* (2006.01)

(52) U.S. Cl.
CPC ..... *G02B 21/0032* (2013.01); *G01N 21/6458* (2013.01); *G02B 21/0048* (2013.01); *G02B 21/0076* (2013.01); *G02B 21/14* (2013.01)

(58) Field of Classification Search
CPC ............ G02B 21/0032; G02B 21/0048; G02B 21/0076; G02B 21/14; G02B 21/367; G02B 21/002; G02B 21/06; G01N 21/6458
See application file for complete search history.

(56) References Cited

U.S. PATENT DOCUMENTS

| | | | | |
|---|---|---|---|---|
| 2013/0286181 A1* | 10/2013 | Betzig | ................. | G02B 27/095 |
| | | | | 348/79 |
| 2014/0099659 A1* | 4/2014 | Keller | ................. | G02B 21/362 |
| | | | | 435/29 |

(Continued)

FOREIGN PATENT DOCUMENTS

| | | |
|---|---|---|
| CN | 107003509 A | 8/2017 |
| WO | 2016138003 A1 | 9/2016 |

OTHER PUBLICATIONS

International Search Report for International Application No. PCT/CN2019/097237 dated Oct. 22, 2019.

*Primary Examiner* — Kiho Kim
(74) *Attorney, Agent, or Firm* — Meunier Carlin & Curfman LLC (57) ABSTRACT

A lattice light sheet microscope includes a single spatial light modulator (SLM), the optical modulation plane of which conjugates to an image plane of an excitation objective and which is configured to: generate an optical lattice by loading a phase map obtained from a central cross section of a corresponding optical lattice of a desired lattice light sheet, and tile the optical lattice by loading a phase map obtained from an off-center cross section of the corresponding optical lattice. The lattice light sheet microscope also includes a transparent annular diaphragm arranged at a plane conjugating to the entrance pupil of the excitation objective lens. The lattice light sheet microscope further includes a first galvanometer configured to: scan each optical lattice in the (Continued)

extending direction thereof so as to form a tiled lattice light sheet.

18 Claims, 8 Drawing Sheets

(56) References Cited

U.S. PATENT DOCUMENTS

| | | | |
|---|---|---|---|
| 2015/0362713 A1* | 12/2015 | Betzig | G02B 21/0064 250/459.1 |
| 2019/0186895 A1* | 6/2019 | Kalkbrenner | G02B 21/0032 |

* cited by examiner

Method of tiling lattice light sheet in LLSM    600

Determine the corresponding optical lattice of the desired lattice light sheet through simulation calculation — 601

Obtain a phase map from the center cross section of the corresponding optical lattice and load it to the single SLM to generate an optical lattice — 602

Obtain a phase map from an off-center section of the corresponding optical lattice and load it to the single SLM to tile the optical lattice — 603

Scan each optical lattice in the extending direction of the optical lattice to form a tiled lattice light sheet. — 604

LATTICE LIGHT SHEET MICROSCOPE AND METHOD FOR TILING LATTICE LIGHT SHEET IN LATTICE LIGHT SHEET MICROSCOPE

TECHNICAL FIELD

The present disclosure relates to a precision optical instrument and a using method thereof, in particular to a lattice light sheet microscopy and a method for tiling a lattice light sheet in a lattice light sheet microscopy.

BACKGROUND

A lattice light sheet microscopy (LLSM) uses light sheets formed by various 2D optical lattices to illuminate samples for imaging. The LLSM can image in two operation modes: dithering mode, in which optical lattices are scanned continuously to form lattice light sheets, thus realizing high-speed imaging; and super-resolution structured illumination microscopy (SR-SIM) mode, in which optical lattices are scanned discretely to obtain imaging results with resolution exceeding the diffraction limit with the assistance of the SR-SIM method.

Compared with other commonly used light sheets in the light sheet microscopy, lattice light sheets (LLSs) have three advantages. Firstly, LLSs better maintain the light sheet thickness and the limitation of the illumination light over a long distance, which ensures high spatial resolution and good optical sectioning ability. Secondly, LLSs illuminate samples with an array of parallel illumination beams, which significantly reduces the peak intensity of the light sheet and the induced light damage. Thirdly, LLSs are coherent, which enables the LLSM to acquire high signal-to-noise ratio (SNR) images when operating in SR-SIM mode for super-resolution imaging.

However, the imaging ability of the LLSM is still limited by the diffraction of light. The LLS becomes thicker, and the constraint against the illumination light becomes weaker as the light sheet size increases, which severely reduces the imaging ability of the LLSM on large samples. Although a larger field of view (FOV) can be achieved by translating the sample, this significantly decreases imaging speed, introduces image splicing problem, and increases the complexity and cost of microscopy. In addition, many biological samples, especially vulnerable and fragile biological ones, are not suitable for rapid movement during imaging.

The recently developed tiling light sheet selective plane illumination microscopy (TLS-SPIM) technology overcomes the contradiction between the light sheet size, light sheet thickness and illumination light constraint by tiling small and thin light sheets in a desired imaging field of view (FOV) and collecting additional images, so that the 3D imaging ability of the light sheet microscopy is maintained in an imaging FOV that is much greater than the light sheet size. Tiling light sheet microscopy may use all light sheets including LLSs for imaging. However, the reported TLS-SPIM microscopy uses two spatial light modulators (SLMs) to generate and tile LLSs. The optical configuration of this microscopy is very different from that of the LLSM that has been widely adopted, which makes it difficult for most LLSM users to use tiling LLSs technology easily.

SUMMARY OF THE INVENTION

The present disclosure is provided to solve the above-mentioned defects in the background. A lattice light sheet microscopy and a method for tiling a lattice light sheet in a lattice light sheet microscopy are needed to tile LLSs conveniently without changing the hardware structure of the conventional LLSM, and maintain the imaging ability of LLSM in an imaging field of view that is much greater than the light sheet size, which is convenient to realize, low in cost and easy to popularize.

According to a first aspect of the present disclosure, there is provided a lattice light sheet microscopy, which comprises a spatial light modulator, an excitation objective, a transparent annular diaphragm, and a first galvanometer. An optical modulation plane of the spatial light modulator is conjugated to an image plane of the excitation objective, and the spatial light modulator is configured to modulate illumination light. The transparent annular diaphragm is arranged at a plane that is conjugated to an entrance pupil of the excitation objective, to filter illumination light modulated by the spatial light modulator. The spatial light modulator is a single spatial light modulator, and is configured to: generate an optical lattice by loading a phase map obtained from a center section of a corresponding optical lattice of a desired lattice light sheet to the spatial light modulator, and tile the optical lattice by loading a phase map obtained from an off-center section of the corresponding optical lattice to the spatial light modulator, And, the first galvanometer is configured to scan each optical lattice in an extending direction of the optical lattice to form a tiled lattice light sheet.

In some embodiments, a position of the lattice light sheet in a propagation direction of excitation light is changed dynamically in an imaging process of a sample.

In some embodiments, the single spatial light modulator is a binary spatial light modulator, and the phase map loaded to the spatial light modulator is a binary phase map, which is obtained by binarizing an amplitude or a phase map of an optical field at a corresponding section.

In some embodiments, the single spatial light modulator is a continuous spatial light modulator, and the phase map loaded to the spatial light modulator is a continuous phase map, which is obtained by an amplitude or a phase map of an optical field at a corresponding section.

In some embodiments, a tiling distance of the lattice light sheet is equal to a distance of the off-center section from which the phase map is obtained with respect to the center section of the corresponding optical lattice.

In some embodiments, a tiling distance of the lattice light sheet is set based on a beam width and a phase map of the illumination light.

In some embodiments, the optical lattice is form based on a coherent beam array.

According to a second aspect of the present disclosure, there is provided a lattice light sheet microscopy, which comprises: a laser generating assembly configured to generate a laser beam; a cylindrical lens configured to expand the laser beam from the laser generating assembly in the extending direction of the optical lattice; a binary spatial light modulator assembly, which comprises a binary spatial light modulator and which is configured to perform phase modulation on expanded laser beam; the transparent annular diaphragm; at least one pair of relay lenses; the first galvanometer, wherein, the transparent annular diaphragm is conjugated to the first galvanometer and the entrance pupil of the excitation objective via the at least one pair of relay lenses; the excitation objective; a detection objective configured to collect fluorescence signals of an excited plane; and a camera configured to image the excited plane.

In some embodiments, the lattice light sheet microscopy further comprises a second galvanometer which is configured to scan the lattice light sheet in an optical axis direction of the detection objective. The relay lenses comprise three pairs of relay lenses. The transparent annular diaphragm is conjugated to the first galvanometer, the second galvanometer, and the entrance pupil of the excitation objective via the three pairs of relay lenses. The binary spatial light modulator assembly comprises a polarizing beam splitter prism, a half-wave plate, and the binary spatial light modulator.

In some embodiments, the laser generating assembly comprises: a plurality of lasers configured to emit a plurality of laser beams of different wavelengths; a first lens group arranged corresponding to each laser and configured to expand and collimate the laser beams to a first diameter.

According to a third aspect of the present disclosure, there is provided a method for tiling a lattice light sheet in a lattice light sheet microscopy. The lattice light sheet microscopy comprises a spatial light modulator, an excitation objective, a transparent annular diaphragm and a first galvanometer. An optical modulation plane of the spatial light modulator is conjugated to an image plane of the excitation objective and the spatial light modulator is configured to modulate illumination light. The transparent annular diaphragm is arranged at a plane conjugated to an entrance pupil of the excitation objective, so as to filter illumination light modulated by the spatial light modulator, and the spatial light modulator is a single spatial light modulator. The method comprises: determining a corresponding optical lattice of a desired lattice light sheet by simulation calculation; acquiring a phase map from a center section of the corresponding optical lattice and loading the phase map to the single spatial light modulator, to generate an optical lattice; acquiring a phase map from an off-center section of the corresponding optical lattice and loading the phase map to the single spatial light modulator, to tile the optical lattice; scanning each optical lattice in an extending direction of the optical lattice to form a tiled lattice light sheet.

In some embodiments, the method comprises: changing dynamically a position of the lattice light sheet in a propagation direction of excitation light in an imaging process of a sample.

In some embodiments, in the case that the single spatial light modulator is a binary spatial light modulator, the phase map loaded to the spatial light modulator is a binary phase map, which is obtained by binarizing an amplitude or a phase map of an optical field at a corresponding section.

In some embodiments, the method further comprises: determining the off-center section from which the phase map is acquired according to a set tiling distance of the lattice light sheet.

In some embodiments, the method further comprises: setting a tiling distance of the lattice light sheet according to a beam width and a phase map of the illumination light.

In some embodiments, the method further comprises: calibrating an illumination laser power of the lattice light sheet microscopy based on an intensity of the tiled lattice light sheet.

In some embodiments, the method further comprises: collecting images of a sample by using each lattice light sheet; extracting a partial image corresponding to an area near a central position of each corresponding optical lattice from each image collected by using each lattice light sheet; and bonding the extracted partial images.

In some embodiments, the method further comprises: readjusting an intensity of corresponding images of the sample based on an intensity of each lattice light sheet.

With the use of a lattice light sheet microscopy and a method for tilting a lattice light sheet in a lattice light sheet microscopy according to various embodiments of the present disclosure, the LLSs can be tiled conveniently without changing the hardware structure of the conventional LLSM, and the high-resolution and high-speed imaging ability of LLSM are maintained in an imaging field of view that is much greater than the light sheet size, which is convenient to realize, low in cost and easy to popularize.

BRIEF DESCRIPTION OF DRAWINGS

In the accompanying drawings which are not necessarily drawn to scale, same reference signs may describe similar components in different views. Same reference signs with letter suffixes or different letter suffixes may indicate different examples of similar components. The accompanying drawings generally illustrate various embodiments by way of example but not limitation and serve to explain the disclosed embodiments together with the description and claims. Such embodiments are illustrative but are not intended to be exhaustive or exclusive embodiments of the present device or method.

DETAILED EMBODIMENTS

In order to make the technical solutions of the present disclosure better understood by a person skilled in the art, the present disclosure will be described in detail with reference to the accompanying drawings and specific embodiments as follows. The embodiments of the present disclosure will be further described in detail in reference to the drawings and specific embodiments, but not as a limitation of the present disclosure.

As used in the present disclosure, "first", "second" and similar words do not indicate any order, quantity or importance, but are only used to distinguish. Similar words such as "include" or "comprise" mean that the elements before such word cover the elements listed thereafter, and the possibility of covering other elements not excluded.

Figure 1A:
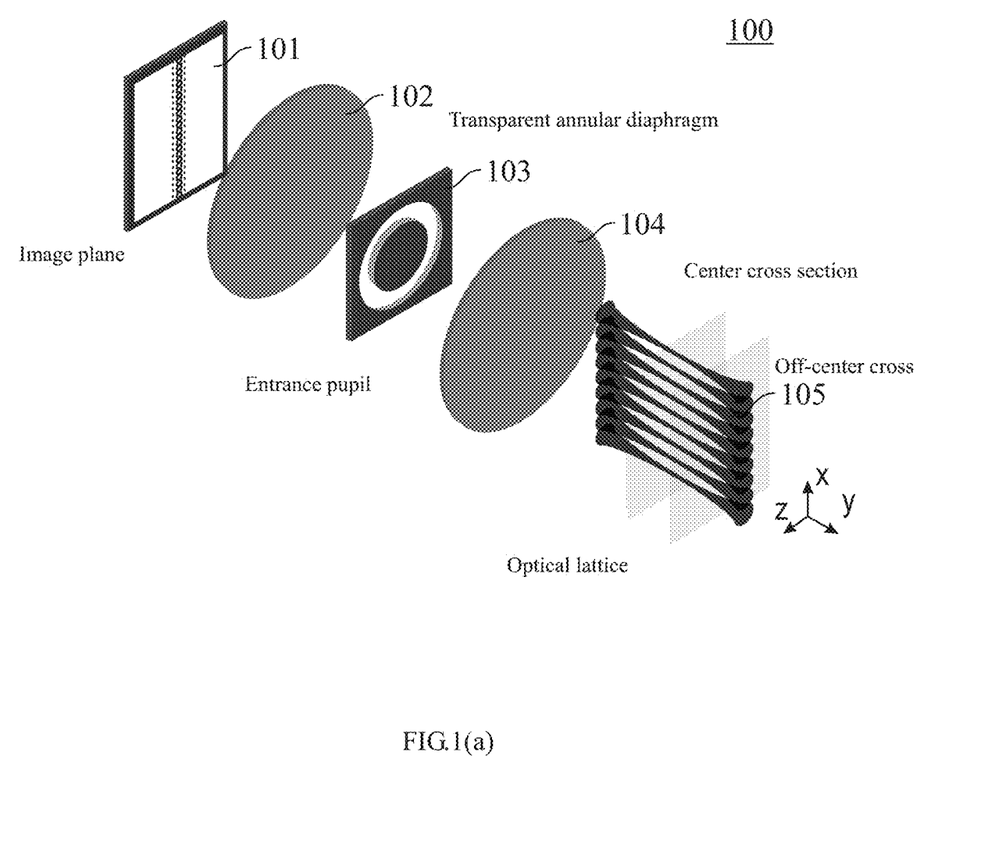
FIG. 1(a) shows an outline optical configuration of the illumination path of an LLSM according to an embodiment of the present disclosure.

FIG. 1(a) shows an outline optical configuration of the illumination path of an LLSM according to an embodiment of the present disclosure, said LLSM may directly adopt the LLSM widely used at present and may avoid changes to hardware. Specifically, the LLSM 100 may include a spatial light modulator (SLM) 101, an excitation objective 102, and a transparent annular diaphragm 103. As shown in FIG. 1(a), an optical modulation plane of the SLM 101 is conjugated to an image plane of the excitation objective 102 and the SLM 101 is configured to modulate the illumination light. The transparent annular diaphragm 103 is arranged at a plane that is conjugated to the entrance pupil of the excitation objective 102, to filter the illumination light modulated by the SLM 101. A corresponding optical lattice 105 is obtained at the image plane of the excitation lens 102 after the excitation light modulated by the SLM 101 is filtered by the transparent annular diaphragm 103, which is conjugated to the entrance pupil of the excitation objective 102. Wherein, an x direction represents an extending direction of the optical lattice, a y direction represents a propagating direction of the excitation light, and a z direction represents an optical axis direction of a detection objective 104.

Figure 1B:
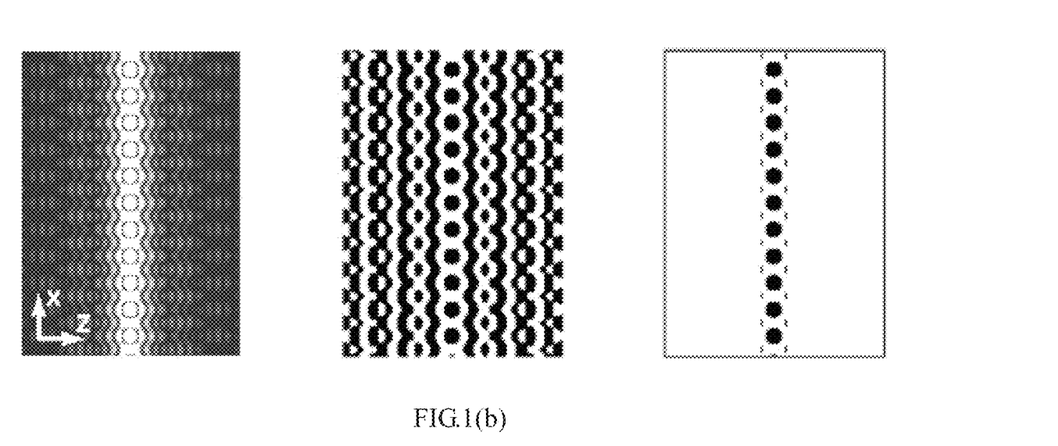
FIG. 1(b) shows an amplitude and phase profiles at an optical field of a center section of a simulated optical lattice according to an embodiment of the present disclosure and a corresponding binary phase map obtained therefrom, which is used to generate an optical lattice in an LLSM.
Figure 1C:
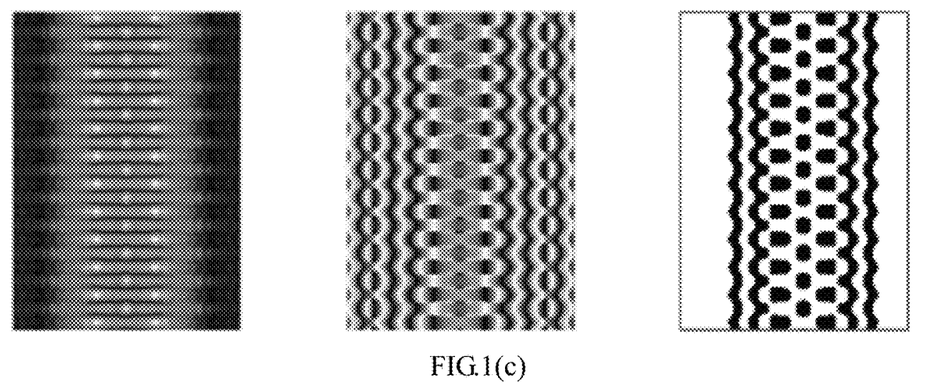
FIG. 1(c) shows an amplitude and phase profiles at an optical field of an off-center section of the same simulated optical lattice as shown in FIG. 1(b) according to an embodiment of the present disclosure and a corresponding binary phase map obtained therefrom, which is used to tile the optical lattice in an LLSM.
Figure 1D:
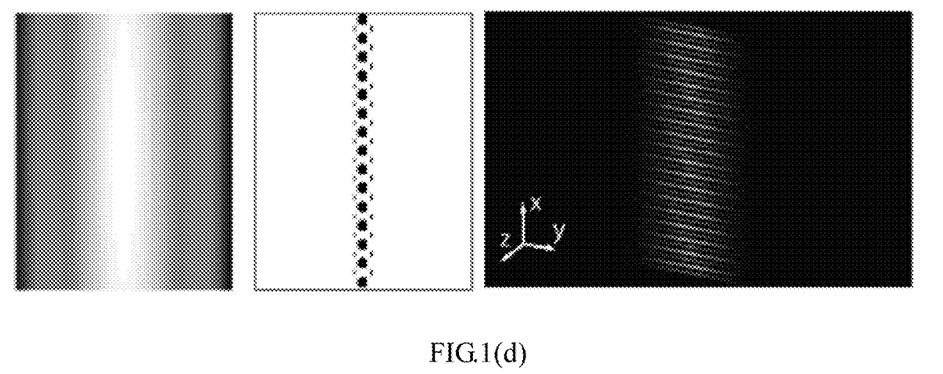
FIG. 1(d) shows 3D volume renderings of the simulated optical lattice generated by modulating the illumination light by loading the phase map obtained by the amplitude and phase profiles at the optical field of the center section of the simulated optical lattice as shown in FIG. 1(b) to the SLM in the LLSM.
Figure 1E:
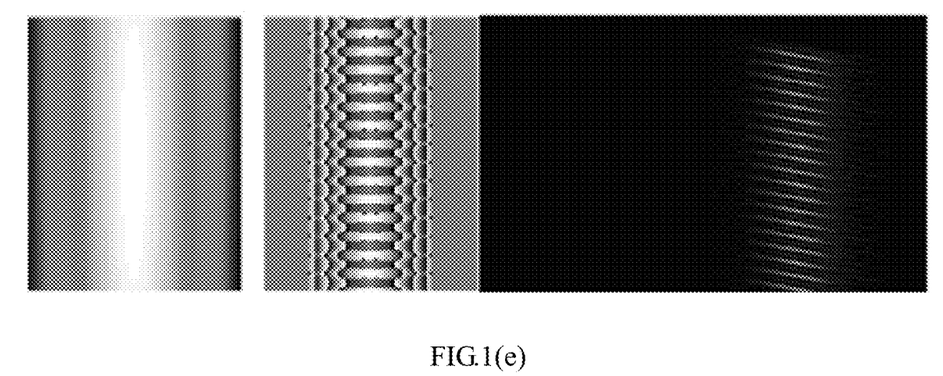
FIG. 1(e) shows 3D volume renderings of the simulated optical lattice tiled by modulating the illumination light by loading a continuous phase map obtained by the amplitude and phase profiles at the optical field of the off-center section of the same simulated optical lattice as shown in FIG. 1(c) to the SLM in the LLSM.
Figure 1F:
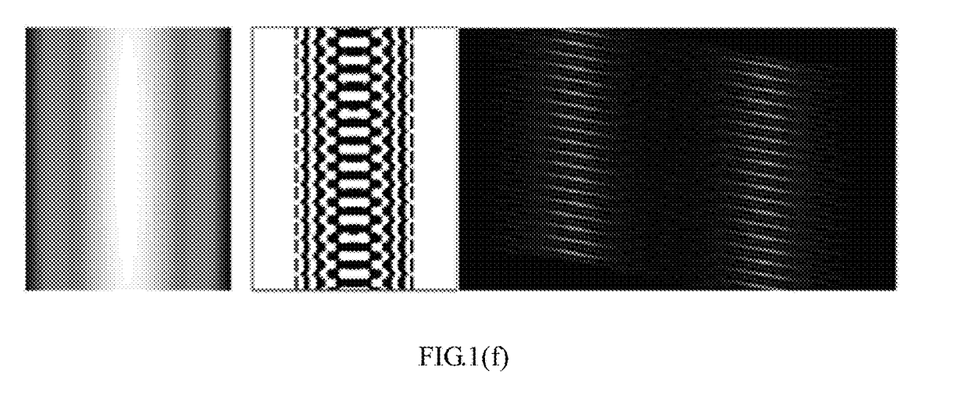
FIG. 1(f) shows 3D volume renderings of the simulated optical lattice tiled by modulating the illumination light by loading the binary phase map obtained by the amplitude and phase profiles at the optical field of the off-center section of the same simulated optical lattice as shown in FIG. 1(c) to the SLM in the LLSM.

The SLM 101 may be a single SLM, and is configured to: generate an optical lattice (as shown in FIG. 1(d)) by loading to said SLM a phase map (as shown in FIG. 1(b)) obtained from a center section (cross section) of the corresponding optical lattice 105 of a desired lattice light sheet, and to tile the optical lattice (as shown in FIGS. 1(e)-1(f) by loading to said SLM a phase map (as shown in FIG. 1(c)) obtained from an off-center section (cross section) of the corresponding optical lattice. Specifically, the desired lattice light sheet may be determined according to the specific imaging requirements for the samples, such as but not limited to the desired imaging field of view, the thickness of the lattice light sheet as required, the two-dimensional size in a vertical direction with respect to the thickness, and the limiting ability of the illumination light as required. Then, according to the desired lattice light sheet, the geometric shape and size of the transparent annular diaphragm 103, such as an outer diameter parameter $NA_{OD}$ and an inner diameter parameter $NA_{ID}$, may be determined and parameters of various optical elements of the LLSM may be determined as well (for example, conventional parameters may be adopted). By means of optical analog simulation (for example, it may be realized by MATLAB programming simulation or other simulation program calculations), the corresponding optical lattice 105 of the desired lattice light sheet and the phase map of optical field at each section may be determined. The intensity profile of the obtained optical lattice may be determined by the loaded phase map and geometrical shape of the transparent annular diaphragm 103.

At present, the widely used LLSM usually includes a single SLM, and the optical lattice may be tiled by using the LLSM with a single SLM, thus avoiding the introduction of additional SLMs and significantly reducing the hardware cost.

In some embodiments, the single SLM 101 may be a continuous SLM, and the phase map loaded to said SLM may be a continuous phase map, which is obtained from the amplitude or phase map of the optical field at the corresponding section, for example, as shown in FIG. 1(e). A single tiled optical lattice may be obtained by tiling the same optical lattice 105 once, as shown in FIG. 1(e), and the tiling distance is equal to the distance of the off-center section from which the phase map is obtained with respect to the center section of the corresponding optical lattice 105.

In some embodiments, the single SLM 101 may be a binary SLM, which has the advantages of fast refresh rate, controllable by an external trigger and low cost, so it is widely used in the general LLSM 100. The loaded binary phase map may be obtained by binarizing the amplitude or phase map of the optical field at the corresponding section of the desired optical lattice 105, for example, resetting its pixel values to 0 and π respectively (as shown in the drawings in the third column of FIG. 1(a) and FIG. 1(b)). As shown in FIG. 1(f), in the case of using the binary SLIM, a pair of tiled optical lattices may be obtained by tiling the same optical lattice 105 once, and the pair of tiled optical lattices are symmetrical with respect to the center section of the same optical lattice 105 and are tiled in the opposite directions with respect to the center section, further, the tiling distance of each optical lattice is equal to the distance of the off-center section from which the phase map is obtained with respect to the center section of the same optical lattice 105.

The LLSM 100 according to various embodiments of the present disclosure may further include a first galvanometer (not shown in FIG. 1(a)), which is configured to: scan each optical lattice in the x direction, so that the generated optical lattice become a lattice light sheet, and each tiled optical lattice also becomes a tiled lattice light sheet, so that a tiled lattice light sheet may be formed. In the imaging process of samples, the tiling process may be dynamic, that is, the position of the tiled lattice light sheet in the y direction may be changed dynamically. Compared with other lattice light sheets, the lattice light sheet formed by scanning the optical lattice better maintain the light sheet thickness and the limitation of the illumination light over a long distance better, thus ensuring high spatial resolution and good optical sectioning ability. Secondly, the lattice light sheet illuminates the sample with an array of parallel illumination beams, which significantly reduces the peak intensity of the light sheet and the induced light damage. Thirdly, the lattice light sheet is coherent, for example, its corresponding optical lattice may be formed based on a coherent beam array, including but not limited to a coherent Gaussian beam array, a coherent Bessel beam array, etc. Benefiting from coherent Bessel beams, diffraction may be reduced significantly, so that high signal-to-noise ratio (SNR) images may be obtained in super-resolution imaging.

Hereinafter, the LLSM and the principle of method for tiling the lattice light sheet therein in various embodiments of the present disclosure will be specifically explained.

Since the optical modulation plane of the SLM used in the LLSM is conjugated to the image plane of the excitation objective, when the optical lattice leaves the image plane of the excitation objective, the optical modulation plane of the SLM is conjugated to the off-center section of said optical lattice. Therefore, the illumination light at the image plane may be modulated by loading a phase map (phase profile) obtained from the off-center section of the same optical lattice to the SLM, which is equivalent to superimposing a spherical phase profile on the wavefront at an entrance pupil plane (a plane that is conjugated to the entrance pupil of the excitation objective), and the tilting of optical lattice may be realized by superimposing the spherical phase profile on the illumination wavefront at the entrance pupil plane (the plane that is conjugated to the entrance pupil of the excitation objective). This principle has been verified by numerical simulations through the diagrams in FIGS. 1(b)-1(f). Among them, FIG. 1(b) and FIG. 1(c) show the phase profile of the optical field at the center section and of section of the same optical lattice, respectively, and the simulation results (such as FIG. 1(e) and FIG. 1(f)) prove that the illumination light at the image plane may be modulated by loading a phase profile map obtained from the off-center section of the corresponding optical lattice to the SLM to further realize the tilting of the optical lattice.

Figure 2A:
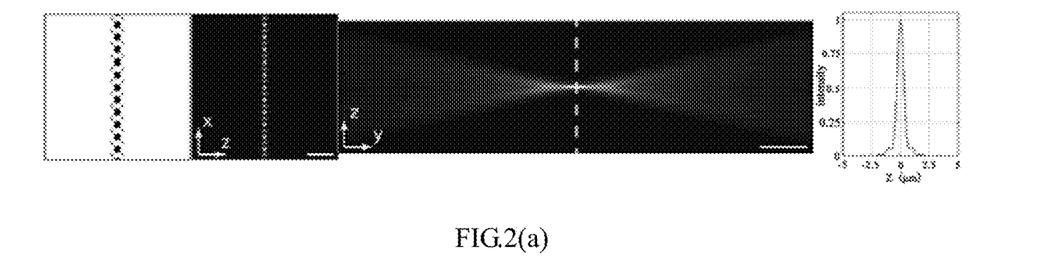
FIGS. 2(a)-2(d) show binary phase maps acquired from different off-center cross sections of the same optical lattice used to tile the optical lattice, and the intensity profiles of the corresponding tiling optical lattices and LLSs at the indicated cross section according to an embodiment of the present embodiment.
Figure 2B:
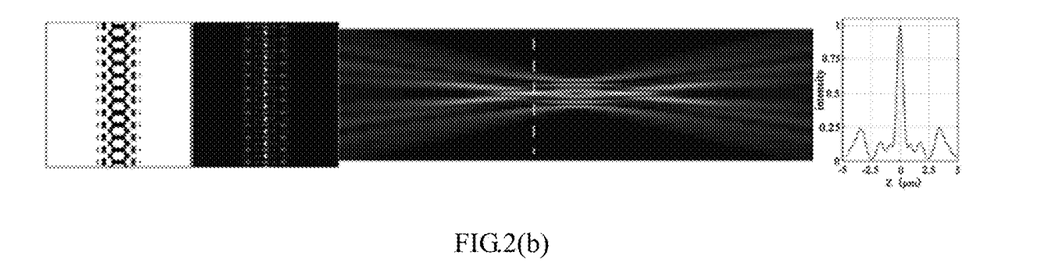
Figure 2C:
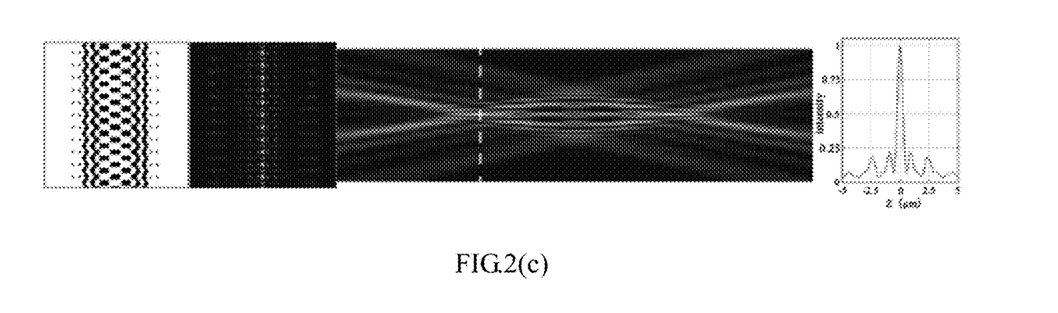
Figure 2D:
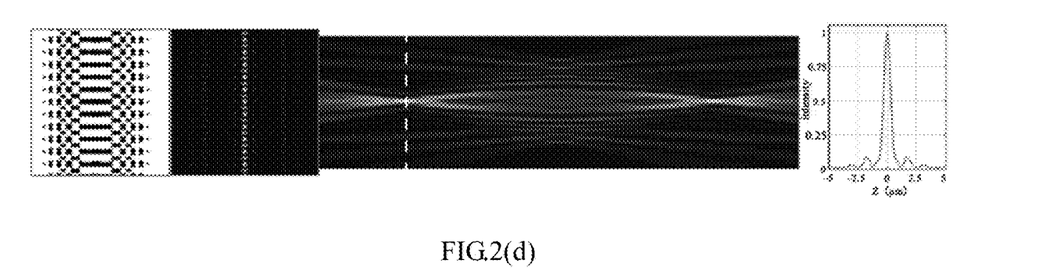

In each of FIGS. 2(a)-2(d), from left to right, the binary phase maps obtained at four different section of the same optical lattice to be loaded to the binary SLM in the LLSM according to the embodiments of the present disclosure, the optical lattices at the indicated sections, the LLS realized by tiling the corresponding optical lattices and scanning, and the intensity profiles are illustrated respectively, with $NA_{OD}=0.4$ and $NA_{ID}=0.22$ of the optical lattice. Among them, what is loaded in FIG. 2(a) is a binary phase map obtained at the center section of the same optical lattice.

FIGS. 2(a)-2(d) show simulation results of generating a tiled optical lattice (and a tiled lattice light sheet) by loading the binary phase maps obtained at these four different sections respectively to the binary SLM in the LLSM. The scale bar in a XZ panel is 5 μm, and the scale bar in an YZ panel is 10 μm.

With the LLSM and the method for the tiling lattice light sheet therein according to various embodiments of the present disclosure, there is no need to add an additional phase modulation device, and the optical configuration of the ordinary LLSM will not be changed, thus making the construction, operation, and maintenance of the LLSM simpler and facilitating the user-friendliness and popularization of this technology.

Figure 3A:
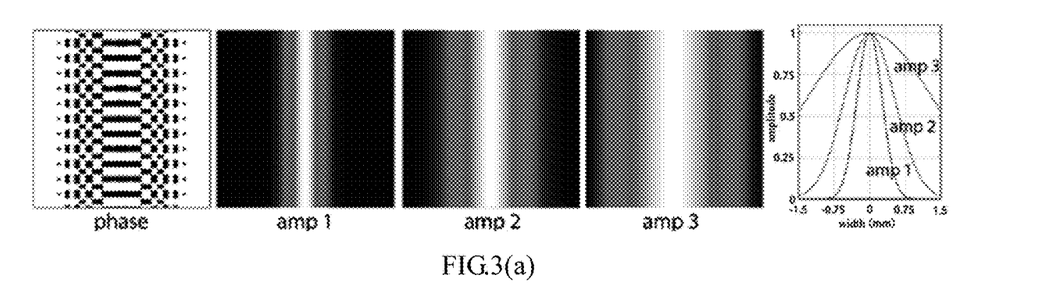
FIG. 3(a) shows a binary phase map for modulating the illumination light of different beam widths (from amp1 to amp3) according to an embodiment of the present disclosure.

FIG. 3(a) shows a binary phase map for modulating the illumination light of different beam widths (from amp1 to amp3) according to an embodiment of the present disclosure, said same binary phase map is loaded to a binary SLM to modulate the illumination light of different beam widths from amp1 to amp3, wherein, for example, the beam width of amp1 is −0.75 to 0.75, the beam width of amp2 is −1.5 to 1.5, and the beam width of amp3 is greater than that of amp2.

Figure 3B:
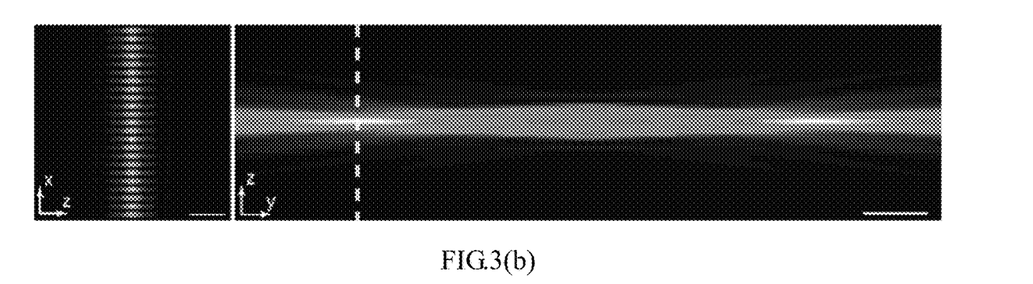
FIGS. 3(b) to 3(d) show simulation results of tiled optical lattices obtained by modulating the illumination beams of different widths (from amp1 to amp3) using the same binary phase map as shown in FIG. 3(a) according to an embodiment of the present disclosure.
Figure 3C:
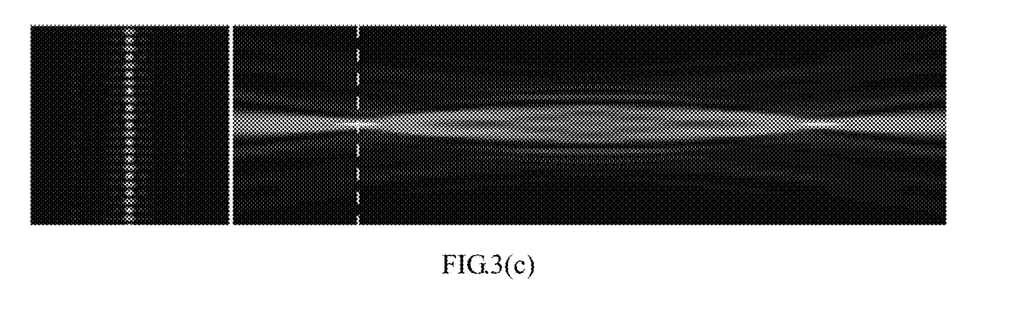
Figure 3D:
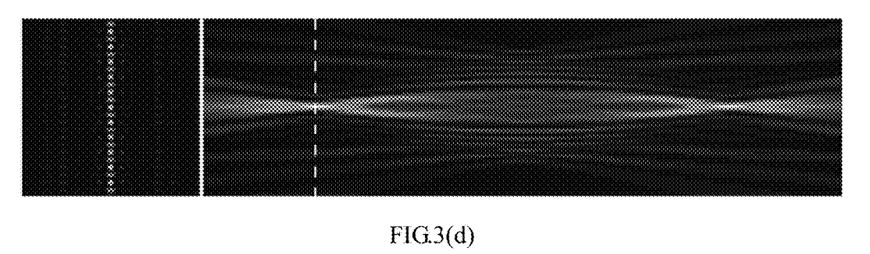

FIGS. 3(b)-3(d) show simulation results of the tiled optical lattices obtained by modulating the illumination beams of different widths (from amp1 to amp3) using the same binary phase map as shown in FIG. 3(a) according to an embodiment of the present disclosure. In FIG. 3(b), the scale bar in a XZ panel is 5 μm, and the scale bar in an YZ panel is 10 μm. FIG. 3(b)-FIG. 3(d) show the limitation on tiling distance caused by the beam width of the illumination light. Specifically, the narrower beam width amp1 can achieve a smaller maximum tiling distance, that is, a smaller tiling distance is applicable, while the wider beam width amp3 can achieve a larger maximum tiling distance, that is, a larger tiling distance is applicable. The tiling distance, which may achieve a good tiling effect for the wider beam width amp3, if applied to narrower beam widths amp1 and amp2, has difficulty in obtaining a high-quality tiled optical lattice within the same large range due to the reduction of the modulation efficiency of the SLM on the beam.

In some embodiments, the tiling distance of the lattice light sheet may be set based on the beam width and phase map of the illumination light. The maximum tiling distance that may be achieved by the LLSM of the embodiment of the present disclosure may be estimated, for example, by numerical simulation.

Figure 4:
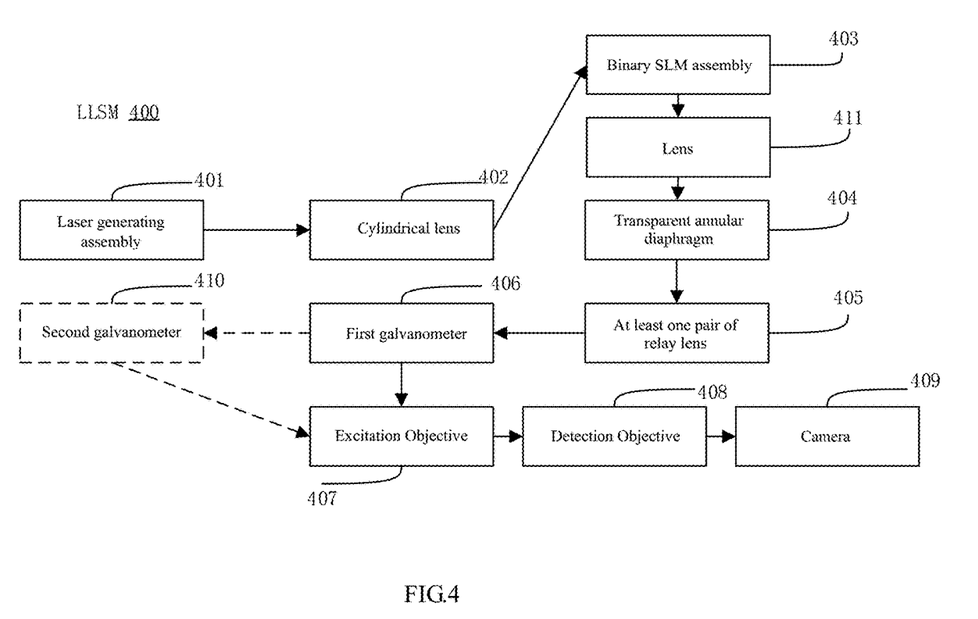
FIG. 4 shows a schematic diagram of an LLSM according to an embodiment of the present disclosure.

FIG. 4 shows a schematic diagram of an LLSM according to an embodiment of the present disclosure. As shown in FIG. 4, the LLSM 400 may include a laser generating assembly 401, a cylindrical lens 402, a binary SLM assembly 403, a transparent annular diaphragm 404, at least one pair of relay lenses 405, a first galvanometer 406, an excitation objective 407, a detection objective 408, and a camera 409. The laser generating assembly 401 may be configured to generate a laser beam. The cylindrical lens 402 is configured to expand the laser beam from the laser generating assembly in the extending direction of the optical lattice. The binary SLM assembly 403 includes the binary SLM and is configured to perform phase modulation on the expanded laser beam. An optical lattice may be generated by loading a phase map obtained from a center section of a corresponding optical lattice of a desired lattice light sheet to the binary SLM and may be tiled by loading phase maps obtained from off-center sections of the corresponding optical lattice to said SLM. The transparent annular diaphragm 404 is arranged at a plane that is conjugated to an entrance pupil of an excitation objective 407, so as to filter the illumination light modulated by the binary SLM assembly 403. A pair of relay lenses 405 represents two lenses with coincident focal points, its technical meaning is clear in the field of microscopy and will not be repeated here. The transparent annular diaphragm 404 is conjugated to the first galvanometer 406 and the entrance pupil of the excitation objective 407 via the at least one pair of relay lenses 405, and the first galvanometer 406 is configured to scan each optical lattice in the extending direction of the optical lattice, including the optical lattice generated in the center and the optical lattice tiled at the off-center tiling distance, so as to form a tiled lattice light sheet. The detection objective 408 has an optical axis which is perpendicular to the optical axis direction of the excitation objective 407 and is configured to collect fluorescence signals of the excited plane. And the camera 409 is configured to image the excited plane. In some embodiments, a lens 411 may be disposed on the optical path between the binary SLM assembly 403 and the transparent annular diaphragm 404.

In some embodiments, the LLSM 400 may further include a second galvanometer 410, which is configured to scan the lattice light sheet in the optical axis direction of the detection objective 408. The first galvanometer 406 and the second galvanometer 410 may be implemented as X Galvo mirrors and Z Galvo mirrors, respectively, for example. By introducing the second galvanometer 410, it is possible to image samples at different depths in the optical axis direction of the detection objective 408, thereby realizing 3D imaging of samples.

In some embodiments, the binary SLM assembly 403 may comprise a polarizing beam splitter prism, a half-wave plate, and a binary spatial light modulator. The binary SLM assembly 403 has a fast refresh rate, controllable by an external trigger, thereby making the control convenient and low in cost. As a pulse element, the efficiency of its diffraction light is also high, which can significantly accelerate the imaging rate of the LLSM 400 on the samples, reduce the cost of tiling the lattice light sheet, simplify its control flow, and improve the imaging efficiency.

Figure 5:
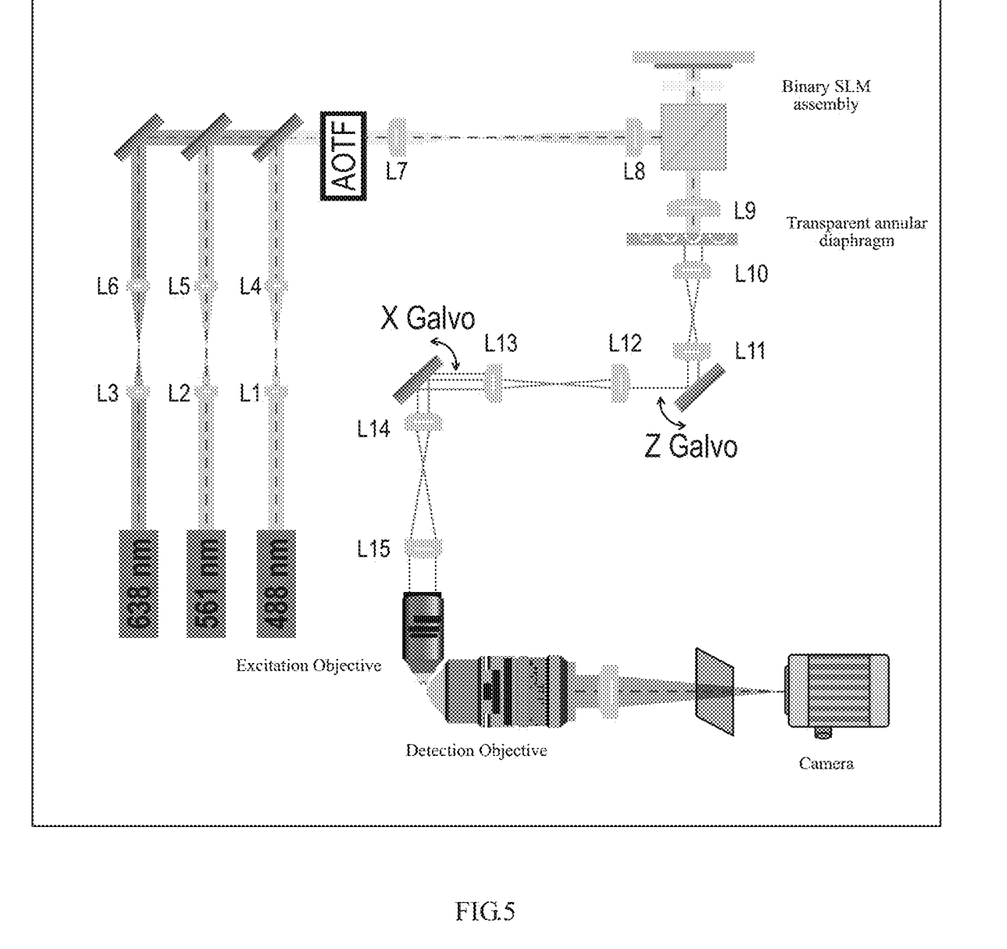
FIG. 5 shows a schematic diagram of an LLSM according to another embodiment of the present disclosure.

FIG. 5 shows a schematic diagram of an LLSM according to another embodiment of the present disclosure. The laser generating assembly adopted by this LLSM may comprise a plurality of lasers, which are configured to emit a plurality of laser beams of different wavelengths. As an example, as shown in FIG. 5, there may be three lasers, and the wavelengths of the laser beams emitted by them may be 488 nm, 561 nm and 638 nm respectively, but are not limited to thereto. The LLSM may include a first lens group which is arranged corresponding to each laser. As an example, L1 and L4 are arranged corresponding to the laser with the laser beam wavelength of 488 nm, L2 and L5 are arranged corresponding to the laser with the laser beam wavelength of 561 nm, and L3 and L6 are arranged corresponding to the laser with the laser beam wavelength of 638 nm. The combined laser beam may be collimated and expanded to a first diameter using this first lens group, for example, but not limited to 4 mm. In some embodiments, the focal lengths of L1, L2, and L3 are equal, for example, but not limited to 8 mm, and the focal lengths of L4, L5, and L6 are equal, for example, but not limited to 20 mm. The laser beam collimated and expanded to the first diameter may be fed to an acousto-optic tunable filter (AOTF) for wavelength selection and intensity modulation. The laser beam emitted from the AOFT may be further expanded by multiple times, for example, but not limited to 10 times, in the X direction (i.e., the extending direction of the lattice) by using a pair of cylindrical lenses L7 and L8, and then directed to the binary SLM assembly for phase modulation. In some embodiments, the focal length of L7 is, for example, but not limited to 25 mm, and the focal length of L8 is, for example, but not limited to 250 mm. Preferably, the binary SLM assembly may be composed of a polarizing beam splitter prism, a half-wave plate and a 2048×1536 binary SLM (Forth Dimension Displays Company, QXGA-3DM, SXGA-3DM and other models).

The modulated laser beams may be projected to the transparent annular diaphragm first. In some embodiments, a lens L9 may be provided on the optical path between the binary SLM assembly and the transparent annular diaphragm, and the focal length of L9 is, for example, but not limited to 350 mm. The transparent annular diaphragm may adopt various structures, for example, it may be provided on a quartz mask. The transparent annular diaphragm may be conjugated to X Galvo galvanometer and Z Galvo galvanometer via three pairs of relay lenses, such as L10 and L11, L12 and L13, and L14 and L15, so as to scan the optical lattice in the x direction and z direction (the optical axis direction of the detection objective). The transparent annular diaphragm is also conjugated to the entrance pupil of the excitation objective (for example, the excitation Objective with parameters of 0.65 NA and 3.74 mm WD produced by Special Optics). The excited fluorescence signal may be imaged on a camera such as a sCMOS camera by a water immersion objective installed on a piezoelectric scanner (for example, a water immersion objective with CFI Apo model and parameters of LWD 25XW, 1.1 NA and 2 mm WD produced by Nikon Company).

This LLSM can realize the dynamic tiling of the lattice light sheet at a faster speed by loading the phase map obtained from the center section of the corresponding optical lattice and the phase map obtained from the off-center section of the corresponding lattice light sheet to the binary SLM component, and can image the samples at different depths in the z direction. At least benefiting from the fast scanning of the binary SLM assembly constituted by the polarizing beam splitter prism, the half-wave plate and the 2048×1536 binary SLM (Forth Dimension Display Company, QXGA-3DM model), it can not only image samples with high resolution and high speed in a large field of view, but also capture 3D dynamic changes of samples.

Figure 6:
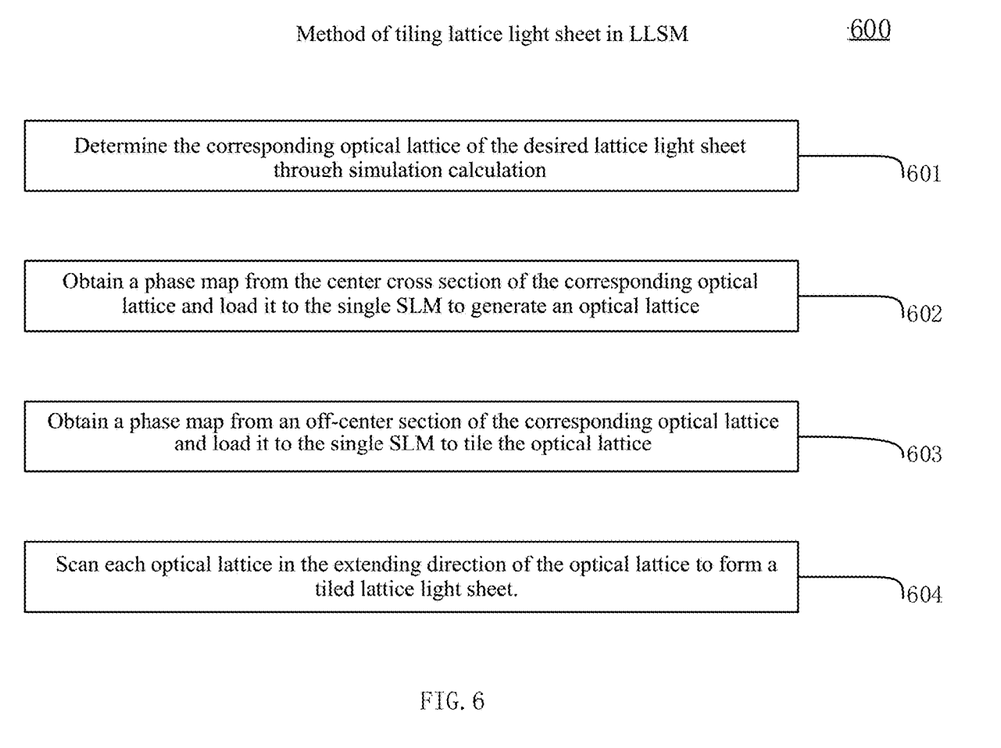
FIG. 6 shows a flowchart of a method for tiling a lattice light sheet LLSM according to another embodiment of the present disclosure.

FIG. 6 shows a flowchart of a method 600 for tiling a lattice light sheet in an LLSM according to another embodiment of the present disclosure. This LLSM may be the LLSM according to various embodiments of the present disclosure, or may be various common LLSMs available in the market, including a single SLM therein. This method 600 starts at step 601, and the corresponding optical lattice of a desired lattice light sheet is determined by simulation calculation. Then, in step 602, a phase map is obtained from the center section of the corresponding optical lattice and loaded to the single SLM, so as to generate an optical lattice. In step 603, a phase map is obtained from the off-center section of the corresponding lattice light sheet and loaded to the single SLM, so as to tile the optical lattice. Then, each optical lattice may be scanned in the extending direction of the optical lattice, so as to form a tiled lattice light sheet (step 604). The "tiling" is performed dynamically, i.e., in the imaging process of samples, the position of the lattice light sheet in the propagation direction of the excitation light is changed dynamically, so that different positions of the large sample may be imaged dynamically. In this manner, the image of samples may be collected by using each lattice light sheet (including the lattice light sheets obtained by scanning the generated central optical lattice and each tiled optical lattice). Partial images corresponding to the area near the central position of the each corresponding optical lattice may be extracted from various images collected by using each optical lattice. Specifically, light sheet at the off-center position of the lattice light sheet becomes thicker, and the light sheet thickness also increases with the off-shift increasing. Thus partial images collected by using the area near the central position where the lattice light sheet thickness is relatively small (for example, it may be defined as a small range around the central position) may be extracted. These partial images have a higher resolution, thus, by bonding these partial images with the higher resolution together, a complete image with a large field of view and high spatial resolution of the sample may be obtained. Since there is no need to translate the sample in the imaging process, the bonding of these partial images does not require image registration processing, which greatly facilitates post-processing.

In some embodiments, in the case that the single spatial light modulator is a binary spatial light modulator, the phase map loaded to the spatial light modulator is a binary phase map, and the binary phase map is obtained by binarizing the amplitude or phase map of the optical field at the corresponding section.

In some embodiments, the method 600 may further include determining the off-center section for acquiring the phase map according to the set tiling distance of the lattice light sheet. In some embodiments, the method 600 may further include setting the tiling distance of the lattice light sheet according to the beam width and phase map of the illumination light.

Details of the above steps described with reference to FIG. 6 have been described in details in other embodiments of the present disclosure, and will not repeated here.

In some embodiments, the method 600 may further include calibrating the illumination laser power of the lattice light sheet microscopy based on the intensity of the tiled lattice light sheet. Or, the method 600 may further include readjusting the intensity of the corresponding image (the image collected by this lattice light sheet) of the sample based on the intensity of each lattice light sheet. In this way, the intensity variation of the lattice light sheets tiled at various positions may be compensated, so that the brightness of each partial image collected by each lattice light sheet is uniform, and the brightness of the complete image obtained by bonding is uniform, and the presentation effect is better.

Figure 7A:
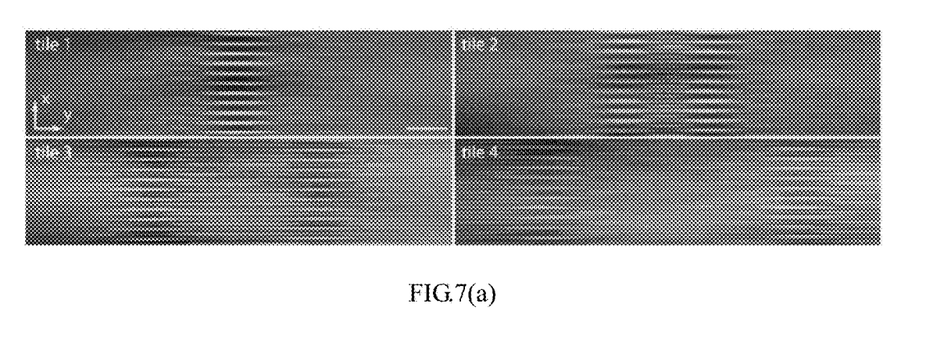
FIG. 7(a) shows images of optical lattices tiled in a dye solution.
Figure 7B:
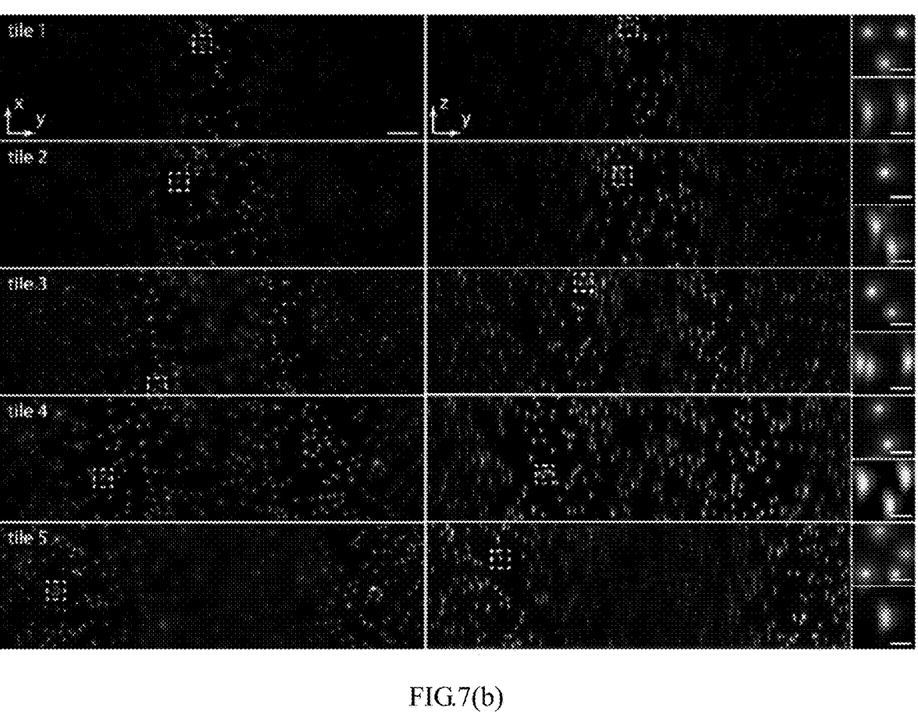
FIG. 7(b) shows a three-dimensional imaging result of fluorescent particles embedded in agarose gel using a method of tiling an LLS in an LLSM according to an embodiment of the present disclosure.

The method is verified by imaging the tiled optical lattice in Alexa 488 dye solution. FIG. 7(a) shows images of optical lattices tiled in a dye solution; FIG. 7(b) shows a three-dimensional imaging result of fluorescent particles embedded in agarose gel using a method for tiling the LLS in an LLSM according to an embodiment of the present disclosure.

As shown in FIG. 7(a), the optical lattice ($NA_{OD}$=0.4, $NA_{ID}$=0.22) is tiled four times in total including the central position, which are a first tile (tile 1, i.e., the optical lattice is generated at the center) and second to fourth tile (tile 2-tile 4, the optical lattice is tiled at the off-center position), and this optical lattice approximately keeps an intensity profile when tilting at different positions. Then, a group of yellow-green fluorescent particles embedded in 4.5% agarose gel with a size of about 100 nm are imaged by using the same tiled lattice light sheet, as shown in FIG. 7(b), in which tiling are performed five times in total, i.e., tile 1-tile 5, which illustrate the maximum intensity projection of imaging results in the XY plane and the YZ plane and the enlarged view of the marked area, wherein the scale bar except the enlarged view is 10 μm, and the scale bar in the enlarged view is 1 μm. It may be seen that the LLSM maintains the spatial resolution of about 260 nm in the transverse direction and about 600 nm in the axial direction in the field of view that is much larger than the length of lattice light sheet.

In addition, although exemplary embodiments have been described herein, the scope thereof includes any and all embodiments having equivalent elements, modifications, omissions, combinations (e.g., solutions in which various embodiments intersect), adaptations or changes based on the present disclosure. The elements in the claims will be broadly interpreted based on the language adopted in the claims, and are not limited to the instances described in this description or during the implementation of the present application, and the examples thereof will be interpreted as non-exclusive. Therefore, this description and examples are intended to be regarded as examples only, with the true scope and spirit being indicated by the following claims and the full scope of equivalents thereof.

The above description is intended to be illustrative and not limiting. For example, the above examples (or one or more solutions thereof) may be used in combination with each other. For example, other embodiments may be used by those of ordinary skill in the art upon reading the above description. In addition, in the above specific embodiments, various features may be grouped together to simplify the disclosure. This should not be interpreted as an intention that an unclaimed disclosed feature is necessary for any claim. On the contrary, the subject matter of the present disclosure may be less than all features of a particular disclosed embodiment. Therefore, the following claims are hereby incorporated into the detailed embodiments as examples or embodiments, wherein each claim is independently taken as a separate embodiment, and it is considered that these embodiments may be combined with each other in various combinations or arrangements. The scope of the present disclosure should be determined with reference to the appended claims and full scope of equivalents to which these claims are entitled.

The above embodiments are only exemplary embodiments of the present disclosure, and are not used to limit the present disclosure. The protection scope of the present disclosure is defined by the claims. A person skilled in the art can make various modifications or equivalent substitutions within the essence and protection scope of the present disclosure, and such modifications or equivalent substitutions should also be regarded as falling within the protection scope of the present disclosure.

The invention claimed is:

1. A lattice light sheet microscope which comprises a spatial light modulator, an excitation objective, a transparent annular diaphragm, and a first galvanometer, wherein
   an optical modulation plane of the spatial light modulator is conjugated to an image plane of the excitation objective, and the spatial light modulator is configured to modulate illumination light;
   the transparent annular diaphragm is arranged at a plane that is conjugated to an entrance pupil of the excitation objective to filter illumination light modulated by the spatial light modulator;
   the spatial light modulator is a single spatial light modulator, and is configured to: generate an optical lattice by loading a phase map obtained from a center section of a corresponding optical lattice of a desired lattice light sheet, and tile the optical lattice by loading phase map obtained from an off-center section of the corresponding optical lattice; and
   the first galvanometer is configured to scan each optical lattice in an extending direction of the optical lattice to form a tiled lattice light sheet.

2. The lattice light sheet microscope according to claim 1, wherein a position of the lattice light sheet in a propagation direction of excitation light is changed dynamically in an imaging process of a sample.

3. The lattice light sheet microscope according to claim 2, wherein a tiling distance of the lattice light sheet is equal to a distance of the off-center section from which the phase map is obtained with respect to the center section of the corresponding optical lattice.

4. The lattice light sheet microscope according to claim 2, wherein the optical lattice is form based on a coherent beam array.

5. The lattice light sheet microscope according to claim 1, wherein the single spatial light modulator is a binary spatial light modulator, and the phase map loaded to the spatial light modulator is a binary phase map, which is obtained by binarizing an amplitude or a phase map of an optical field at a corresponding section.

6. The lattice light sheet microscope according to claim 1, wherein the single spatial light modulator is a continuous spatial light modulator, and the phase map loaded to the spatial light modulator is a continuous phase map which is obtained by an amplitude or a phase map of an optical field at a corresponding section.

7. The lattice light sheet microscope according to claim 1, wherein a tiling distance of the lattice light sheet is set based on a beam width and a phase map of the illumination light.

8. The lattice light sheet microscope according to claim 1, wherein the lattice light sheet microscope comprises:
   a laser generating assembly configured to generate a laser beam;
   a cylindrical lens configured to expand the laser beam from the laser generating assembly in the extending direction of the optical lattice;
   a binary spatial light modulator assembly, which comprises a binary spatial light modulator and is configured to perform phase modulation on the expanded laser beam;
   the transparent annular diaphragm;
   at least one pair of relay lenses;
   the first galvanometer, wherein, the transparent annular diaphragm is conjugated to the first galvanometer and the entrance pupil of the excitation objective via the at least one pair of relay lenses;
   the excitation objective;
   a detection objective configured to collect fluorescence signals of an excited plane; and
   a camera configured to image the excited plane.

9. The lattice light sheet microscope according to claim 8, wherein
   the lattice light sheet microscope further comprises a second galvanometer which is configured to scan the lattice light sheet in an optical axis direction of the detection objective
   the at least one pair of relay lenses comprise three pairs of relay lenses, the transparent annular diaphragm is conjugated to the first galvanometer, the second galvanometer, and the entrance pupil of the excitation objective via the three pairs of relay lenses and
   the binary spatial light modulator assembly comprises a polarizing beam splitter prism, a half-wave plate, and the binary spatial light modulator.

10. The lattice light sheet microscope according to claim 8, wherein the laser generating assembly comprises:
   a plurality of lasers configured to emit a plurality of laser beams of different wavelengths;
   a first lens group arranged corresponding to each laser and configured to expand and collimate the laser beams to a first diameter.

11. A method for tiling a lattice light sheet in a lattice light sheet microscope, wherein the lattice light sheet microscope comprises a spatial light modulator, an excitation objective, a transparent annular diaphragm and a first galvanometer, wherein an optical modulation plane of the spatial light modulator is conjugated to an image plane of the excitation objective and the spatial light modulator is configured to modulate illumination light, wherein the transparent annular diaphragm is arranged at a plane conjugated to an entrance pupil of the excitation objective to filter illumination light modulated by the spatial light modulator, and wherein the spatial light modulator is a single spatial light modulator, wherein the method comprises:
   determining a corresponding optical lattice of a desired lattice light sheet by simulation calculation;
   acquiring a phase map from a center section of the corresponding optical lattice and loading the phase map to the single spatial light modulator to generate an optical lattice;
   acquiring a phase map from an off-center section of the corresponding optical lattice and loading the phase map to the single spatial light modulator to tile the optical lattice; and
   scanning each optical lattice in an extending direction of the optical lattice to form a tiled lattice light sheet.

12. The method according to claim 11, wherein the method further comprises: changing dynamically a position of the lattice light sheet in a propagation direction of excitation light in an imaging process of a sample.

13. The method according to claim 11, wherein in the case that the single spatial light modulator is a binary spatial light modulator, the phase map loaded to the spatial light modulator is a binary phase map, which is obtained by binarizing an amplitude or a phase map of an optical field at a corresponding section.

14. The method according to claim 11, wherein the method further comprises: determining the off-center section from which the phase map is acquired according to a set tiling distance of the lattice light sheet.

15. The method according to claim 11, wherein the method further comprises: setting a tiling distance of the lattice light sheet according to a beam width and a phase map of the illumination light.

16. The method according to claim 11, wherein the method further comprises: calibrating an illumination laser power of the lattice light sheet microscopy based on an intensity of the tiled lattice light sheet.

17. The method according to claim 11, wherein the method further comprises:
   collecting images of a sample by using each lattice light sheet;
   extracting a partial image corresponding to an area near a central position of each corresponding optical lattice from each image collected by using each lattice light sheet; and
   bonding the extracted partial images.

18. The method according to claim 17 wherein, the method further comprises: readjusting an intensity of corresponding images of the sample based on an intensity of each lattice light sheet.

* * * * *